United States Patent [19]

Engelhardt et al.

[11] Patent Number: 4,551,513
[45] Date of Patent: Nov. 5, 1985

[54] WATER SOLUBLE COPOLYMERS

[75] Inventors: Friedrich Engelhardt, Frankfurt; Klaus Kuhlein, Kelkheim; Ulrich Riegel, Frankfurt; Sigmar von Halasz, Kelkheim, all of Fed. Rep. of Germany; Jeffery C. Dawson, Katy; Anthony R. Reed, Houston, both of Tex.

[73] Assignees: Cassella Aktiengesellschaft, Fed. Rep. of Germany; Dresser Industries, Inc., Houston, Tex.

[21] Appl. No.: 663,326

[22] Filed: Oct. 18, 1984

Related U.S. Application Data

[63] Continuation of Ser. No. 534,083, Sep. 20, 1983, abandoned, which is a continuation of Ser. No. 216,671, Dec. 15, 1980, abandoned.

[51] Int. Cl.$^4$ ............................................. C08F 20/54
[52] U.S. Cl. .................................. 526/307.1; 524/555; 524/801
[58] Field of Search ..................................... 526/307.1

[56] References Cited

U.S. PATENT DOCUMENTS

| 2,760,977 | 8/1956 | Hener et al. |
| 2,864,861 | 6/1956 | Wohusiedler et al. |
| 2,864,862 | 12/1958 | Sutherland |
| 3,696,085 | 10/1972 | Lederer ............................ 526/307.1 |
| 3,931,089 | 1/1976 | Karl |
| 3,934,651 | 1/1976 | Nierode et al. |
| 3,978,164 | 8/1976 | Le Boeuf et al. |
| 4,055,502 | 10/1977 | Swanson |
| 4,061,580 | 12/1977 | Jahnke |
| 4,079,011 | 3/1978 | Tate |
| 4,079,027 | 3/1978 | Phillips et al. |
| 4,088,584 | 5/1978 | Smalley et al. |
| 4,098,987 | 7/1978 | Barua et al. |
| 4,100,079 | 7/1978 | Sinkovitz |
| 4,107,057 | 8/1978 | Dill et al. |
| 4,144,179 | 3/1979 | Chatterji |
| 4,146,486 | 3/1979 | Hessert et al. |
| 4,163,476 | 8/1979 | Tate |
| 4,163,727 | 8/1979 | Inks |
| 4,277,592 | 7/1981 | Eichhorn ............................ 526/307.1 |

FOREIGN PATENT DOCUMENTS 482897 4/1938 United Kingdom .

Primary Examiner—Paul R. Michl
Attorney, Agent, or Firm—Connolly and Hutz

[57] ABSTRACT

New copolymers soluble in water and aqueous acids are disclosed comprising in a statistical distribution in the macromolecule at least 5% by weight of entities containing a formylamino functionality and at least 10% by weight of entities containing an amino carbonyl functionality, which are stable in high concentrations of Bronsted-Lowery acids and can be used as friction reducers in the stimulation of oil or gas wells.

17 Claims, 3 Drawing Figures

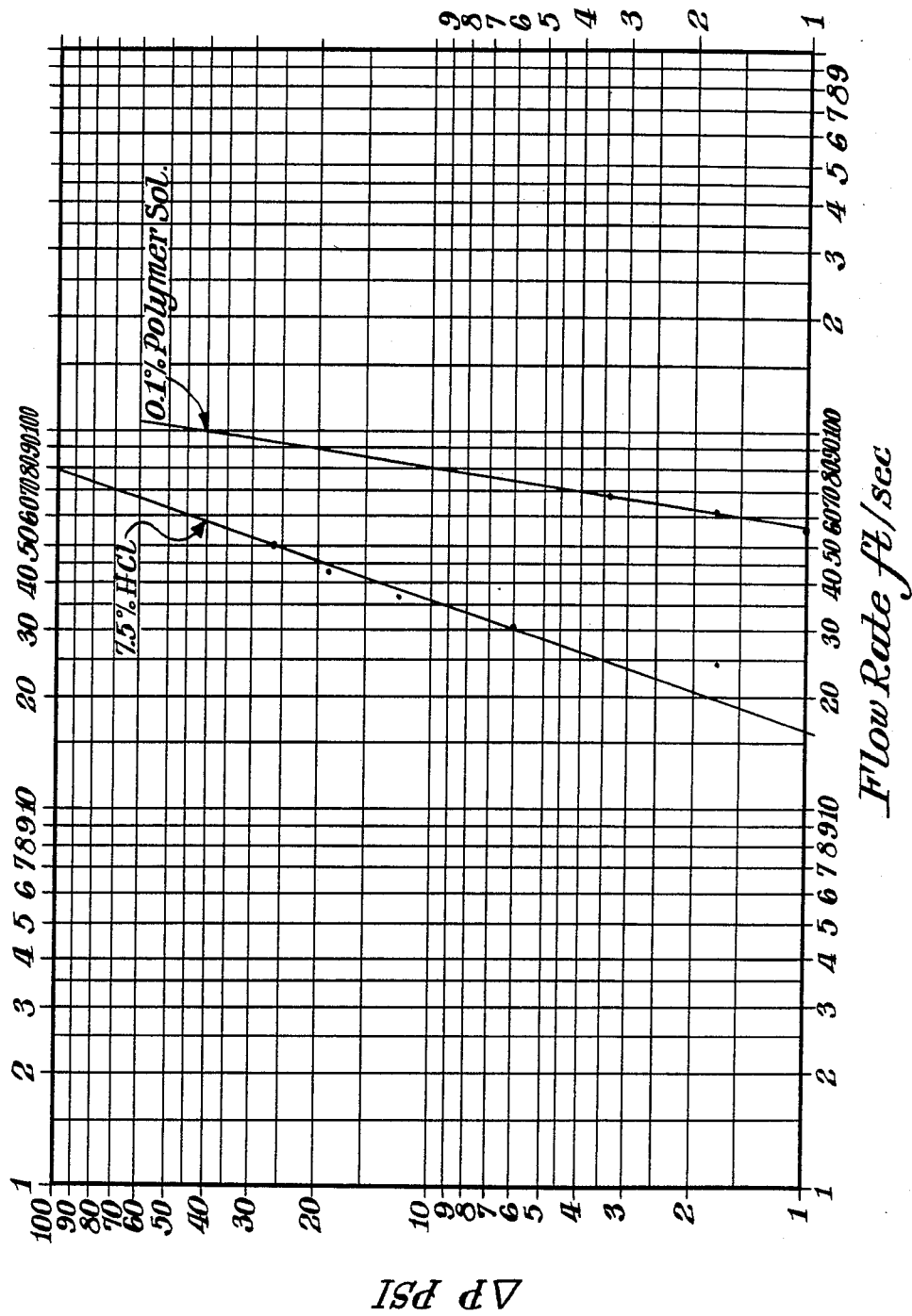

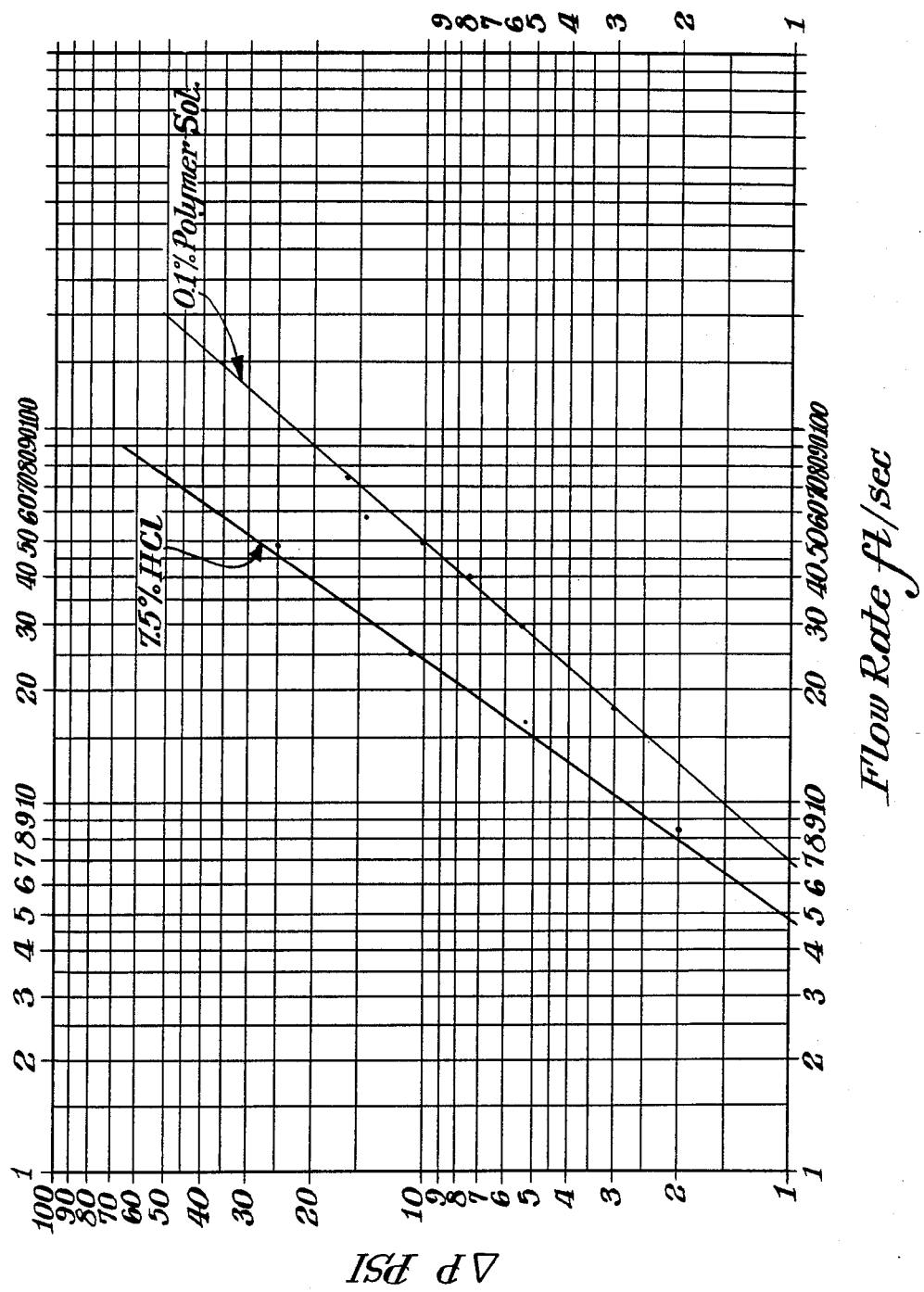

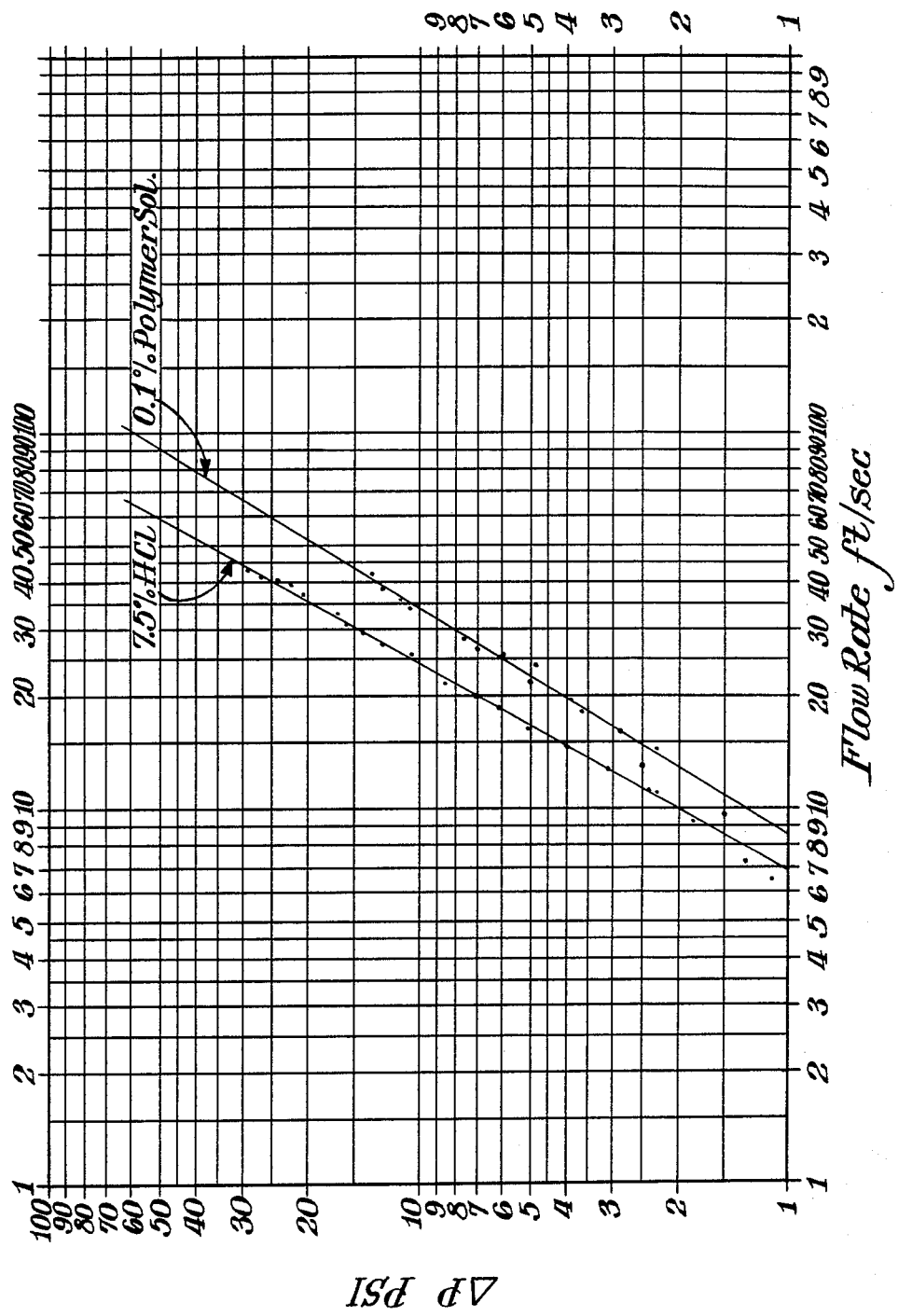

WATER SOLUBLE COPOLYMERS

This is a continuation of application Ser. No. 534,083 filed Sept. 20, 1983, abandoned, which in turn was a continuation of application Ser. No. 216,671 filed Dec. 15, 1980, now abandoned.

This invention relates to new copolymers soluble in water and aqueous acids which are stable in high concentrations of Bronsted-Lowery acids. More particularly, it relates to a polymer which can be used as a friction reducer in the acid stimulation of oil or gas wells. The copolymer comprises in a statistical distribution in the macromolecule at least 5% by weight of entities containing a formylamino functionality (A) and at least 10% by weight of entities containing an amino carbonyl functionality (B).

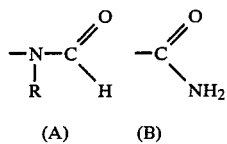

(A)  (B)

A well stimulation technique which can be used to enhance the recovery of oil or natural gas from subterranean carbonate formations is called fracture-acidizing. Carbonate formations include dolomite, limestone or other reservoir rock containing calcarious material. Normally, fracture-acidizing involves the injection of an aqueous acid, which may or may not contain a proppant, into a wellbore at such pressures as to exceed the formation stresses thereby inducing new fractures in the formation. Fractures are natural or induced cracks or channels in the formation matrix. Stimulation by this technique is achieved by allowing the acid to etch the fracture face or the fluid can simultaneously etch the fracture face and transport proppant to the induced fracture. In each case, a more conductive channel is provided by the nonalignment of the fracture faces which will allow the oil or gas to flow to the wellbore after the injecting pressure is relieved.

When injecting an aqueous acid solution into a wellbore, a substantial amount of injection pressure is lost due to friction which occurs between the fluid which is in turbulent flow and the walls of the conduit. As the friction pressure increases with the rate of injection, less treating pressure is hydraulically transferred to the calcareous formation. However, by adding a low concentration of polymer, the turbulent flow of the fluid at even higher rates in the conduit becomes laminar and as a result, the friction pressure is greatly reduced.

Friction reducers which are commonly used in fracture-acidizing applications induce polysaccharides such as hydroxyethylcellulose, xanthan gum or hydroxypropyl guar or synthetic polymers based on polyacrylamide. The problem with polysaccharide friction reducers is their lack of durability in high concentrations of acid. Normally, polysaccharides hydrolize or degrade in the presence of strong acids which eliminate their friction reducing characteristics. The synthetic polyacrylamides also possess unfavorable characteristics. In the presence of strong acids, polyacrylamides readily hydrolyze to insoluble degradation products. These precipitated degradation products can act as potential sources of formation damage restricting the flow of oil or gas to the wellbore.

The present invention provides a polymer which can act as an improved friction reducing agent for the fracture-acidizing of subterranean calcarious formations. This improved polymer is acid soluble and its degradation products are both acid soluble and stable. Particularly, the new copolymers of this invention comprise 5 to 50% by weight of entities of the formula I

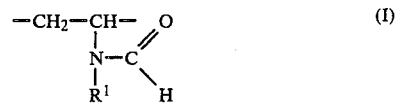

10 to 95% by weight of entities of the formula II

and 0 to 85% by weight of entities of the formula III

wherein $R^1$ stands for hydrogen or methyl or hydroxymethyl; $R^2$ stands for hydrogen or methyl and X stands for cyano; the carboxyl group or its alkali or ammonium salts, the alkoxycarbonyl group having 1 to 6, preferably 1 to 3 carbon atoms; the hydroxyalkoxycarbonyl group having 1 to 3 carbon atoms; the N-methylolamidocarbonyl group $HOCH_2NH-CO-$; the methylol group of which may optionally be etherified with alkanols having 1 to 4 carbon atoms; an alkanoylamino group having 1 to 4 carbon atoms which may optionally be N-substituted with methylol or alkyl having 1 to 4 carbon atoms, pyrrolidonyl-(1), phenyl, pyridinium;

the sulfonic acid group; a sulfoalkylamidocarbonyl group having 1 to 4 carbon atoms; the phosphonic acid group, it being possible for sulfonic and phosphonic acid groups to occur as alkali or ammonium salts; a radical of the formula IV

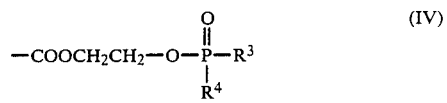

wherein $R^3$ and $R^4$ are the same or different and represent alkyl having 1 to 4, preferably 1 or 2 carbon atoms, a radical of the formula V

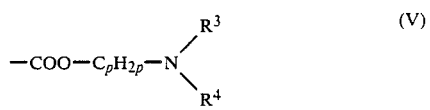

wherein $R^3$ and $R^4$ have the meanings given above and p represents a number from 1 to 4, or a radical of the formula VI

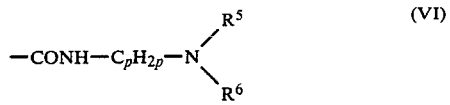

wherein $R^5$ and $R^6$ are the same or different and represent alkyl having 1 to 4, preferably 1 or 2 carbon atoms and p has the meaning given above. Also included are the quaternized moieties corresponding to formulas (V) and (VI) quaternized by dimethyl sulfate or methyl chloride.

The copolymers of this invention are statistical. That means that the distribution of the entities I to III in the macromolecule is statistical.

It stands to reason that the copolymers may contain several different entities of the formula (I) and (III), for example, several different radicals X. As a rule, the radicals X being present in a single macromolecule have not more than 3, preferably not more than 2, different meanings. Copolymers of this kind are prepared using several different comonomers carrying an X radical, as a rule not more than 3, preferably not more than 2. Generally, the copolymers of this invention have K-values (cf. Fikentscher, "Cellulosechemie" Vol. 13, page 58(1932)) of between about 25 and 250 which correspond to molecular weights of about 20,000 to $15 \times 10^6$. Polymers useful as friction reducers preferably have a K-value between about 50 and 200 which correspond to molecular weights of about 100,000 to $4 \times 10^6$.

Preferred copolymers according to this invention consists of 5 to 30 by weight of entities of the formula I, 50 to 80% by weight of entities of the formula II, and 1 to 60% by weight of entities of the formula III.

Further, copolymers are preferred in which $R^2$ signifies hydrogen or methyl or X signifies the carboxyl group; the sulfonic acid group; 3-sulfo-2-methyl-propyl-(2)-amidocarbonyl of the formula

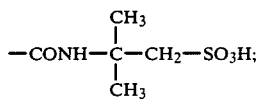

an alkanoylamino group having 1 to 4 carbon atoms which may optionally be N-substituted with methylol or alkyl having 1 to 4 carbon atoms; pyrrolidonyl-(1) or a radical of the formulas V and VI given and defined above, where each acid group can also occur as Na-, K- or NH$_4$-salt.

The copolymers of this invention are readily soluble in water or aqueous acid solutions and hence can be easily handled. In fracture-acidizing applications, the polymer can be introduced to the acid solution as an aqueous polymer solution ranging from 0.5% to 6% by weight (polymer solutions in excess of 6% are too viscous to manipulate), hydrocarbon dispersions containing emulsifiers and 20 to 50% polymer by weight or oil in water or water in oil emulsions containing emulsifiers and 20 to 50% polymer by weight. The preferred system is a water in oil emulsion containing the highest possible percentage of polymer to produce a stable emulsion, normally 20 to 75%. Suitable oils useful in such water in oil emulsions include normal or branched paraffinic hydrocarbons having a boiling point of 150° C. to 250° C. Due to the polymer composition and properties, the polymers are effective friction reducers in concentrations of 0.06 to 0.12% polymer and from ambient temperature to elevated temperatures exceeding 80° C. for long periods of time exceeding 10 days. Although hydrolytic degradation of the linear polymer occurs on the pendent groups of the polymer, the products of the degradation remain acid soluble and will not precipitate from solution. Preferred acids to be used with the copolymer are those which are normally liquid and are inorganic or are strong lower organic acids. Examples of acids which are compatible with the polymer include hydrofluoric, hydrochloric, formic, acetic, monochloracetic, dichloracetic or trichloroacetic acid. The most common acid used in well stimulation is hydrochloric acid and it is normally used in concentrations between 3 and 28% by weight depending on treating conditions and reservoir characteristics. The copolymers of the invention are manufactured by copolymerising 5 to 50% by weight of an N-substituted vinyl formamide of the formula Ia

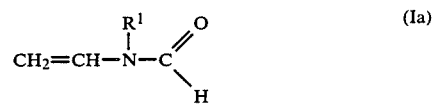

10 to 95% by weight of acrylamide and 0 to 85% by weight of an ethylenically unsaturated monomer of the formula IIIa

wherein $R^1$, $R^2$ and X have the meaning given above.

Preferably, 5 to 30% by weight of the vinylformamide (Ia) 50 to 80% by weight of acrylamide and 1 to 60% by weight of the monomer of the formula IIIa are copolymerised.

A most preferred range is 10 to 20% N-vinyl formamide, 50 to 70% acrylamide and 10 to 40% of monomers of formula IIIa.

If copolymers are desired which have several different radicals X, several different comonomers of the formula IIIa, as a rule 3, preferably 2, are used in the copolymerisation. The copolymerisation may be performed according to any known polymerising process in a pH range from 4 to 12, preferably 6 to 9.

To adjust the pH value alkaline reacting salts of alkali metals, e.g. alkalicarbonates, alkalihydrogencarbonates, alkaliborates, di- or trialkaliphosphates, alkalihydroxides, ammonia or organic amines of the formula NR$_3{}^7$ are used wherein $R^7$ is hydrogen, alkyl having 1 to 4 carbon atoms or hydroxyethyl whereby at least one of the radicals $R^7$ is different from hydrogen. Preferred bases for adjusting the pH value are the alkali compounds mentioned above, especially sodium hydroxide, potassium hydroxide, sodium carbonate and hydrogencarbonate, potassium carbonate and hydrogencarbonate and sodium- and potassium borates. Another preferred base is NH$_3$.

The polymerisation reaction can be initiated by energetic, electromagnetic or corpuscular radiation or by all substances which form radicals. Accordingly, possible polymerisation initiators are organic per-compounds such as, for example, benzoyl peroxide, alkyl hydroperoxides, such as, for example, butyl hydroperoxide, cumene hydroperoxide, p-menthane hydroperoxide, dialkyl peroxides, such as di-tert.-butyl peroxide, or inorganic per-compounds such as, for example, potassium, sodium or ammonium persulphate and hydrogen peroxide, and azo compounds such as, for example, azobisisobutyronitrile, 2,2'-azobis-(2-amidino propane) hydrochloride or azobisisobutyramide. It is advantageous to employ the organic or inorganic per-compounds in combination with reducing agents. Examples of suitable reducing agents are sodium pyrosulphite, sodium bisulphite or condensation products of formaldehyde with sulphoxylates. The polymerisation reaction can be carried out particularly advantageously using Mannich adducts of sulphinic acids, aldehydes and amino compounds, such as are described in German Pat. No. 1,301,566.

It is known furthermore to add, to the polymerisation batches, small amounts of moderators, which harmonise the course of the reaction by flattening the reaction rate/time diagram, improve the reproducibility of the reaction and hence lead to uniform products with extremely little variation in quality. Examples of suitable moderators of this type are nitrilo-trispropionylamide or hydrohalides or monoalkylamines, dialkylamines or trialkylamines, such as, for example, dibutylamine hydrochloride. In manufacturing the copolymers of the invention, such compounds can also be present with advantage. Furthermore, so-called regulators can be added to the polymerisation batches, that is to say compounds which influence the molecular weight of the polymers formed. Usable known regulators are, for example, alcohols such as methanol, ethanol, propanol, isopropanol, n-butanol, sec.-butanol and amyl alcohol, alkylmercaptans such as dodecylmercaptan and tert.-dodecylmercaptan, isooctyl thioglycolate, and some halogen compounds, such as carbon tetrachloride, chloroform and methylene chloride.

As usual, the polymerisation is carried out in an atmosphere of protective gas, preferably under nitrogen.

The reaction may be performed in solution, in emulsion or under the conditions of precipitative polymerisation at a temperature of from 20° to 120° C., preferably from 40° to 100° C.

If water is used as a solvent for the reaction the polymerisation is run in solution and a viscous, aqueous solution of the copolymerisates of the present invention is obtained. The product can be isolated either by distilling off the water from the solution or by mixing the aqueous solution with organic solvents miscible with water, whereby the copolymer precipitates and can be separated from the liquid phase, e.g. by filtration.

It is preferred, however, to use the aqueous solution of the copolymer obtained directly, optionally after having adjusted to a certain desired concentration.

If copolymerising is performed in an organic solvent, as for instance in a lower alkanol, preferably e.g. in tert. butanol, the reaction runs under the conditions of precipitative polymerisation. In this case the copolymer formed precipitates from the starting solution as a solid compound during the course of the reaction. It can be easily isolated in the usual manner, e.g. by filtration under suction and drying the filter residue. Of course, it is also possible, and sometimes preferred, to distill off the organic solvent.

Monomers which provide units of formula I in the copolymer of this invention are N-vinyl formamide, N-vinyl-N-methyl formamide and N-vinyl-N-hydroxymethyl formamide with the first two mentioned monomers being preferred. Acrylamide is the monomer used to provide units of formula II in the copolymer. Units of formula III are introduced into the copolymer by copolymerizing said formamide and acrylamide monomers with one or more and preferably two of the following monomers of the formula:

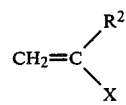

wherein $R^2$ and X have the following meanings:

| $R^2$ | —H | —CH₃ | —H | —CH₃ | —H |
|---|---|---|---|---|---|
| X | —CN | —CN | —COOH⁽¹⁾ | —COOH⁽¹⁾ | —COOCH₃ |
| $R^2$ | —CH₃ | —H | —CH₃ | —H | —CH₃ |
| X | —COOCH₃ | —COOC₂H₅ | —COOC₂H₅ | —COOC₄H₉ | —COOC₄H₉ |
| $R^2$ | —H | —H | —CH₃ | —H | —CH₃ |
| X | —COOC₆H₁₃ | —COOC₂H₄OH | —COOC₂H₄OH | —COOC₃H₆OH | —COOC₃H₆OH |
| $R^2$ | —H | —CH₃ | —H | —CH₃ | |
| X | —CONHCH₂OH | —CONHCH₂OH | —CONHCH₂OCH₃ | —CONHCH₂OCH₃ | |
| $R^2$ | —H | —CH₃ | —H | | |
| X | —CONHCH₂OC₂H₅ | —CONHCH₂OC₂H₅ | —CONHCH₂OC₄H₉ | | |
| $R^2$ | —H | —H | —H | | |
| X | —NHCOCH₃ | —NHCOC₂H₅ | —NHCOC₃H₇ | | |
| $R^2$ | —CH₃ | —H | —H | —H | —CH₃ |
| X | —N—CHO<br>\|<br>CH₂OH | —N—COCH₃<br>\|<br>CH₂OH | —N—COC₂H₅<br>\|<br>CH₂OH | —N—COC₃H₇<br>\|<br>CH₂OH | —N—CHO<br>\|<br>CH₃ |
| $R^2$ | —H | —H | —H | —H | —H |
| X | —N—COCH₃<br>\|<br>CH₃ | —N—COC₃H₇<br>\|<br>CH₃ | —N—CHO<br>\|<br>C₂H₅ | —N—COC₂H₅<br>\|<br>C₂H₅ | —N—CHO<br>\|<br>C₄H₉ |
| $R^2$ | —H | —H | —CH₃ | —H | —H |

-continued

| | 7 | | 8 | |
|---|---|---|---|---|
| X | −N(C₄H₉)−COCH₃ | pyrrolidinone | pyrrolidinone | −SO₃H⁽¹⁾ |
| | | (N-substituted, =O) | (N-substituted, =O) | |

| | | | | |
|---|---|---|---|---|
| R² | −CH₃ | −H | −CH₃ | |
| X | −SO₃H⁽¹⁾ | −PO₃H₂⁽¹⁾ | −PO₃H₂⁽¹⁾ | |

| R² | −H | −H |
|---|---|---|
| X | −CONH−CH₂SO₃H⁽¹⁾ | −CONHCH₂CH₂CH₂SO₃H⁽¹⁾ |

| R² | −H | −H |
|---|---|---|
| X | −CONHC₂H₄−SO₃H⁽¹⁾ | −CONHCH(CH₃)−CH₂−SO₃H⁽¹⁾ |

| R² | −H | −H |
|---|---|---|
| X | −CO−NH−CH₂CH₂CH₂CH₂−SO₃H⁽¹⁾ | −CO−NH−CH(CH₃)−CH₂CH₂−SO₃H⁽¹⁾ |

| R² | −H | −CH₃ |
|---|---|---|
| X | −CO−NH−C(CH₃)₂−CH₂−SO₃H⁽¹⁾ | −CONHC₂H₄SO₃H⁽¹⁾ |

| R² | −CH₃ | −CH₃ |
|---|---|---|
| X | −CONH−C₂H₄SO₃H⁽¹⁾ | −CO−NH−C(CH₃)₂−CH₂SO₃H⁽¹⁾ |

| R² | −H | −CH₃ |
|---|---|---|
| X | −COO−CH₂CH₂−O−P(=O)(CH₃)−CH₃ | −COO−CH₂CH₂−O−P(=O)(CH₃)−CH₃ |

| R² | −H | −H |
|---|---|---|
| X | −COO−CH₂CH₂−O−P(=O)(C₂H₅)−C₂H₅ | −COO−CH₂CH₂−O−P(=O)(CH₃)−C₃H₇ |

| R² | −H | −H |
|---|---|---|
| X | −COO−CH₂CH₂−O−P(=O)(C₄H₉)−CH₃ | −COO−CH₂CH₂−O−P(=O)(C₃H₇)−C₃H₇ |

| R² | −H | −CH₃ |
|---|---|---|
| X | −COO−CH₂CH₂−N(CH₃)₂ | −COO−CH₂CH₂−N(CH₃)₂ |

| R² | −H | −CH₃ |
|---|---|---|
| X | −COO−CH₂CH₂−N(C₂H₅)₂ | −COO−CH₂CH₂−N(C₃H₇)(CH₃) |

| R² | −H | −H |

-continued

| | | |
|---|---|---|
| X | —COO—CH₂CH₂—N(C₄H₉)(C₄H₉) | —COO—CH₂CH₂—N(C₄H₉)(CH₃) |
| R² | —H | —CH₃ |
| X | —COO—CH₂CH₂CH₂—N(CH₃)(CH₃) | —COO—CH₂CH₂CH₂—N(CH₃)(CH₃) |
| R² | —H | —CH₃ |
| X | —COO—CH(CH₃)—CH₂—N(C₂H₅)(C₂H₅) | —COO—CH(CH₃)—CH₂—N(CH₃)(CH₃) |
| R² | —H | —CH₃ |
| X | —CONH—CH₂CH₂—N(CH₃)(CH₃) | —CONH—CH₂CH₂—N(CH₃)(CH₃) |
| R² | —H | —CH₃ |
| X | —CONH—CH₂CH₂—N(C₂H₅)(C₂H₅) | —CONH—CH₂CH₂—N(C₂H₅)(C₂H₅) |
| R² | —H | —H |
| X | —CONH—CH₂CH₂—N(C₃H)(CH₃) | —CONH—CH₂CH₂—N(C₄H₉)(C₄H₉) |
| R² | —H | —H |
| X | —CONH—CH₂CH₂—N(C₄H₉)(CH₃) | —CONH—CH₂CH₂CH₂—N(CH₃)(CH₃) |
| R² | —CH₃ | —H |
| X | —CONH—CH₂CH₂CH₂—N(CH₃)(CH₃) | —CONH—CH(CH₃)—CH₂—N(C₂H₅)(C₂H₅) |
| R² | —CH₃ | —H | —H |
| X | —CONH—CH(CH₃)—CH₂—N(CH₃)(CH₃) | —N⊕(pyridinium) | —CONH—C(CH₃)(CH₃)—CH₂—N(CH₃)(CH₃) |
| R² | —CH₃ | —CH₃ | —H |
| X | —N⊕(pyridinium) | —COO—CH₂CH₂—N(C₂H₅)(C₂H₅) | —COO—CH₂CH₂—N(C₃H₇)(CH₃) |

⁽¹⁾Since N—vinyl amides are not stable under acidic conditions, reaction mixtures containing acidic substances must be neutralized prior to the polymerization such as with the above mentioned basic comonomers.

Preferred monomers used to provide units of formula III in the copolymer are:
N-Vinylformamide,
N-Vinyl-N-methyl-formamide,
N-Vinyl-acetamide,
N-Vinyl-N-methyl-acetamide, N-Vinylpyrrolidone,
Acrylic acid, alkali or ammonium salts of acrylic acid,

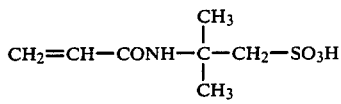

or alkali or ammonium salt thereof,

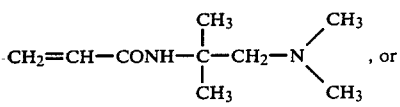

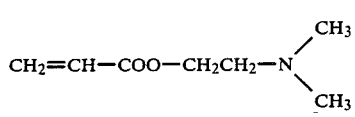

The above described copolymers are believed to be novel copolymers except where X in formula III is the sulfonic acid group, the sulfoalkylamidocarbonyl group and salts of such groups (cf. U.S. Pat. No. 4,048,077).

The copolymers disclosed herein are also useful in the gelling of acid solutions useful for example in acid fracturing as disclosed and claimed in application Ser. No. 216,672, now abandoned filed concurrently herewith (refiled as Ser. No. 399,682 on July 11, 1982 now U.S. Pat. No. 4,507,440,) entitled "Water Soluble Crosslinkable Polymer Compositions, Their Preparation and Use" in the names of Friedrich Engelhardt, Steffen Piesch, Juliane Balzer and Jeffrey C. Dawson.

The following working examples demonstrate the manufacture of the copolymers of this invention.

The abbreviations used in the Examples and in the included tables have the following meanings:

AM: acrylamide
VIMA: N-vinyl-N-methylacetamide
AMPS: 2-acrylamido-2-methylpropane sulfonic acid
where the exponent
1 signifies the ammonium salt,
2 signifies the salt with dimethyl-β-hydroxyethylamine,
3 signifies the potassium salt and
4 signifies the sodium salt.
AS: acrylic acid
MAS: methacrylic acid
MAM: N-methylol-acrylamide
VSSNa: sodium salt of vinylsulfonic acid
NMVA: N-methylol-vinylacetamide
VIA: vinylacetamide
VIFA: vinylformamide
VIMFA: vinyl-methyl-formamide
MVIFA: N-methylol-vinylformamide
MVIA: N-methylol-vinylformamide
VPA: vinylphosphonic acid
A: ammoniumperoxidisulfate
B: a combination of ammoniumperoxidisulfate+-dibutylammonium hydrochloride

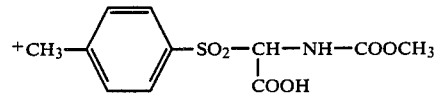

azo-isobutyronitrile.

EXAMPLE 1

Into a 2 l reaction vessel placed in a water bath and fitted with a mechanical stirrer, reflux condensor, dropping funnel and gas-inlet are placed 400 mls of deionized water and 17.7 mls of a 25% by weight aqueous solution of ammonia. While introducing a slow stream of nitrogen, 9.3 g of acrylamido-methylpropane sulfonic acid are added and as soon as a clear solution is obtained 60 g of acrylamide, 18.6 g of N-vinylpyrrolidone and 14.7 g of N-vinylformamide are admixed. The pH value of the solution is 6.5. The reaction mixture is heated to 50° C. and the polymerization is triggered by addition of 5 mls of a 20% by weight aqueous solution of ammonium peroxidisulfate. After an induction period of about 10 minutes the reaction starts, the temperature rises to 65° C. and the reaction mixture becomes viscous. The batch is then heated to 80° C. and kept at this temperature for two hours. After recooling to room temperature, a highly viscous solution is obtained.

EXAMPLE 2

Into a 2 l reaction vessel placed in a water bath and fitted with a mechanical stirrer, reflux-condenser, dropping funnel and gas-inlet are placed 500 ml of tert. butanol and suspended therein 20 g of AMPS while stirring.

Then 2.2 l of NH₃ gas are introduced and 65 g of acrylamide and 15 g of N-vinylformamide are added. While introducing a stream of nitrogen the reaction mixture is heated up to 50° C. and 1.0 g of azoisobutyronitrile is added. After an induction period of some minutes the polymerisation starts. The reaction temperature rises up to 81° C. and the polymer precipitates. The reaction mixture is kept for another two hours at 80° C. during which time it becomes a viscous suspension. The polymer may be isolated by filtration under suction and drying under reduced pressure at 50° C. It is also possible to isolate the polymer by distilling off the solvent under reduced pressure. The polymer obtained represents a white light powder easily soluble in water. The K-value according to Fikentscher is 148.

According to the procedure described in the preceding examples the copolymers of the following Tables 1 and 2 may be prepared.

TABLE I

| Example No | Concentration of monomers (% by weight) | | | | | | | | |
|---|---|---|---|---|---|---|---|---|---|
| | AM | AS | AMPS | VIFA | VIMFA | VIMA | VIA | MAM | MVIA | MVIFA |
| 3 | 65 | 20 | | 15 | | | | | | |
| 4 | 65 | | 20 | 15 | | | | | | |
| 5 | 65 | 20 | | | | 15 | | | | |
| 6 | 65 | | 20 | | | 15 | | | | |
| 7 | 65 | 20 | | | 15 | | | | | |
| 8 | 65 | | 20 | | 15 | | | | | |
| 9 | 65 | 20 | | | | | 15 | | | |
| 10 | 65 | | 20 | | | | 15 | | | |
| 11 | 90.6 | | 9.4 | | | | | | | |

TABLE I-continued

| Example | c1 | c2 | c3 | c4 | c5 | c6 | c7 | c8 | c9 | c10 |
|---|---|---|---|---|---|---|---|---|---|---|
| 12 | 81.1 | | | 18.9 | | | | | | |
| 13 | 81.1 | | 9.4 | 9.4 | | | | | | |
| 14 | 65 | | 20 | | 15 | | | | | |
| 15 | 65 | 20 | | | 15 | | | | | |
| 16 | 65 | | | 20 | 15 | | | | | |
| 17 | 65 | 20 | | | 15 | | | | | |
| 18 | 50 | | | | 50 | | | | | |
| 19 | 20 | | | | 80 | | | | | |
| 20 | | | | | 100 | | | | | |
| 21 | 65 | 20 | | | 15 | | | | | |
| 22 | 65 | 20 | | | 15 | | | | | |
| 23 | 65 | 20 | | | | 15 | | | | |
| 24 | 65 | 20 | | | | 15 | | | | |
| 25 | 65 | | 20 | | 15 | | | | | |
| 26 | 65 | | 20 | | 15 | | | | | |
| 27 | 90.6 | | | | | | 9.4 | | | |
| 28 | 81.2 | | 9.4 | | | | 9.4 | | | |
| 29 | 65 | 20 | | | 15 | | | | | |
| 30 | 65 | 20 | | | 15 | | | | | |
| 31 | 71.7 | | 9.4 | 18.9 | | | | | | |
| 32 | 71.7 | 9.4 | | 18.9 | | | | | | |
| 33 | 65 | 15 | | 20 | | | | | | |
| 34 | 61 | 14 | | 25 | | | | | | |
| 35 | 56.8 | 13.2 | | 30 | | | | | | |
| 36 | 65 | 15 | | 20 | | | | | | |
| 37 | 61 | 14 | | 25 | | | | | | |
| 38 | 56.8 | 13.2 | | 30 | | | | | | |
| 39 | 56.8 | 13.2 | | | | | 30 | | | |
| 40 | 71.7 | 9.4 | | | | | 18.9 | | | |
| 41 | 71.7 | | 9.4 | | | | 18.9 | | | |
| 42 | 65 | | 20 | | 15 | | | | | |
| 43 | 65 | | 20 | 15 | | | | | | |
| 44 | 80 | | | 20 | | | | | | |
| 45 | 70.5 | | 9.4 | 20.1 | | | | | | |
| 46 | 60 | | 20 | 15 | | | | 5 | | |
| 47 | 60 | | 20 | 15 | | | | | 5 | |
| 48 | 60 | 20 | | 15 | | | | 5 | | |
| 49 | 60 | 20 | | 15 | | | | | | 5 |
| 50 | 60 | | 20 | 15 | | | | | | 5 |
| 51 | 51.8 | 13.2 | | 30 | | | | 5 | | |
| 52 | 51.8 | 13.2 | | 30 | | | | | 5 | |
| 53 | 51.8 | 13.2 | | 30 | | | | | | 5 |

| Example No | further additives | K value | reaction medium | concentration (% by weight) | pH value | catalyst | starting temperature °C. |
|---|---|---|---|---|---|---|---|
| 3 | | 155 | water | 18 | 5 | A | 50 |
| 4 | | 129 | " | 18 | 8.4 | A | 50 |
| 5 | | 193 | " | 18 | 4.8 | A | 50 |
| 6 | | 149 | " | 18 | 8 | A | 50 |
| 7 | | 169 | " | 18 | 4.8 | A | 50 |
| 8 | | 124 | " | 18 | 8.3 | A | 50 |
| 9 | | 154 | " | 18 | 4.9 | A | 50 |
| 10 | | 122 | " | 18 | 8.0 | A | 50 |
| 11 | | 130 | " | 21 | 10 | B | 20 |
| 12 | | 111 | " | 21 | 9.8 | B | 20 |
| 13 | | 140 | " | 21 | 7.8 | B | 20 |
| 14 | | 208.5 | " | 18 | 8.3 | A | 40 |
| 15 | | 188 | " | 18 | 4.9 | A | 40 |
| 16 | | 199 | " | 18 | 8.2 | A | 40 |
| 17 | | 216.5 | " | 18 | 4.9 | A | 40 |
| 18 | | 60.5 | " | 25 | 4.0 | A | 23 |
| 19 | | 51 | " | 25 | 4.2 | A | 23 |
| 20 | | 25 | " | 25 | 8 | A | 23 |
| 21 | | 203 | " | 18 | 7 | A | 40 |
| 22 | | 201 | water | 18 | 8 | A | 40 |
| 23 | | 223 | " | 18 | 7 | A | 40 |
| 24 | | 223 | " | 18 | 8 | A | 40 |
| 25 | | 182 | " | 18 | 8 | A | 40 |
| 26 | | 187 | " | 18 | 7 | A | 40 |
| 27 | borax | 130 | " | 21 | 10.1 | B | 35 |
| 28 | " | 175 | " | 21 | 7.9 | B | 35 |
| 29 | | 164 | " | 10 | 5 | A | 40 |
| 30 | | 120 | " | 5 | 5 | A | 40 |
| 31 | | 136 | " | 21 | 8.0 | B | 35 |
| 32 | | 143 | " | 21 | 8.3 | B | 35 |
| 33 | | 188 | " | 18 | 8 | A | 40 |
| 34 | | 174 | " | 18 | 8.2 | A | 40 |
| 35 | | 171 | " | 18 | 8 | A | 40 |
| 36 | | 144 | " | 10 | 8 | A | 40 |
| 37 | | 139 | " | 10 | 8 | A | 40 |
| 38 | | 131 | " | 10 | 8 | A | 40 |
| 39 | | 139.5 | " | 10 | 8.1 | A | 40 |

TABLE I-continued

| | | | | | | | |
|---|---|---|---|---|---|---|---|
| 40 | borax | 188 | water | 21.6 | 8.4 | B | 35 |
| 41 | " | 149 | " | 21.6 | 7.9 | B | 35 |
| 42 | | 151 | " | 10 | 7.3 | A | 40 |
| 43 | | 143 | " | 10 | 7 | A | 40 |
| 44 | borax | 92 | " | 21.6 | 7.5 | B | 35 |
| 45 | " | 131 | " | 21.6 | 7.5 | B | 35 |
| 46 | | 186 | " | 17 | 4.8 | A | 40 |
| 47 | | 172.7 | " | 17 | 4.8 | A | 40 |
| 48 | | 210.9 | " | 17 | 4.8 | A | 40 |
| 49 | | 198 | " | 17 | 4.8 | A | 40 |
| 50 | | 164 | " | 17 | 4.7 | A | 40 |
| 51 | | 132.8 | " | 10 | 4.8 | A | 40 |
| 52 | | 131.5 | " | 10 | 4.8 | A | 40 |
| 53 | | 117.4 | " | 10 | 4.8 | A | 40 |

TABLE II

| Example No | Concentration of monomers (% by weight) | | | | | | | | | |
|---|---|---|---|---|---|---|---|---|---|---|
| | AM | AS | AMPS | VIFA | VIMFA | VIMA | VIA | MAM | MVIA | MVIFA |
| 54 | 65 | 20 | | 15 | | | | | | |
| 55 | 65 | | 20 | 15 | | | | | | |
| 56 | 65 | 20 | | | | 15 | | | | |
| 57 | 65 | | 20 | | | 15 | | | | |
| 58 | 65 | 20 | | | 15 | | | | | |
| 59 | 65 | | 20 | | 15 | | | | | |
| 60 | 65 | 20 | | | | | 15 | | | |
| 61 | 60 | 20 | | 15 | | | | 5 | | |
| 62 | 60 | | 20 | 15 | | | | 5 | | |
| 63 | 60 | 20 | | 15 | | | | | | 5 |
| 64 | 60 | | 20 | 15 | | | | | | 5 |
| 65 | 60 | 20 | | 15 | | | | | 5 | |
| 66 | 60 | | 20 | 15 | | | | | 5 | |

| Example No | further additives | K value | reaction medium | concentration (% by weight) | pH value | catalyst | starting temperature °C. |
|---|---|---|---|---|---|---|---|
| 54 | | 148 | tert. butanol | 20 | 9.1 | C | 50 |
| 55 | | 178 | tert. butanol | 20 | 9.1 | C | 50 |
| 56 | | 142 | tert. butanol | 20 | 9.0 | C | 50 |
| 57 | | 176 | tert. butanol | 20 | 9.1 | C | 50 |
| 58 | | 131.5 | tert. butanol | 20 | 9.2 | C | 50 |
| 59 | | 157 | tert. butanol | 20 | 8.8 | C | 50 |
| 60 | | 141 | tert. butanol | 20 | 8.9 | C | 50 |
| 61 | | 144.5 | tert. butanol | 17.5 | 9.0 | C | 50 |
| 62 | | 179.5 | tert. butanol | 17.5 | 9.6 | C | 50 |
| 63 | | 177 | tert. butanol | 17.5 | 9.3 | C | 50 |
| 64 | | 181.5 | tert. butanol | 17.5 | 8.9 | C | 50 |
| 65 | | 146.2 | tert. butanol | 17.5 | 8.6 | C | 50 |
| 66 | | 182.7 | tert. butanol | 17.5 | 8.9 | C | 50 |

EXAMPLE 67

Into a 500 ml reaction vessel placed in a water bath and fitted with a mechanical stirrer, reflux-condenser, dropping funnel and gas-inlet is placed a solution of 0.23 g of sorbitan monolaurate, 1.09 g of sorbitan monostearate, 0.14 g of sorbitan mono-oleate and 3.61 g of polyoxyethylene sorbitan monostearate in 56.4 g of Exxon's hydrocarbon Norpar 13, a paraffin straight-chain hydrocarbon. The solution is degassed with nitrogen and heated to 60° C. Then a solution containing 33.6 g of acrylamide, 5.4 g of AMPS, 6.6 g of N-methyl-N-vinylacetamide, 6.6 g of N-vinylformamide and 7.8 g of N-vinyl pyrrolidone is added to 78.8 g of deionized water containing 2.6 ml of 10% sodium hydroxide solution. The pH value was 7.4. Then 23 mg of 2,2'-Azobis-(2-Amidinopropane)hydrochloride is added to the aqueous solution. This solution is added to the hydrocarbon solution with moderate stirring forming a milky white emulsion. As the temperature approaches 60° C., the stirring is reduced to approximately 60 revolutions per minute. After an induction period of 10 minutes, the temperature begins to rise. At approximately 80° C., the emulsion becomes transparent and stirring is increased. The peak temperature is 97° C. After cooling to 80° C., the temperature is held for two hours yielding a stable emulsion containing 30% active polymer.

EXAMPLE 68

67 g of Exsol D, a deodorized kerosene boiling between 190° to 240° C., sold by Esso Chemie of Germany are introduced into a 1-liter polymerization flask and heated to a temperature of 60° C., with weak stirring, 0.27 g of sorbitan monolaurate, 1.3 g of sorbitan monostearate, 0.17 g of sorbitan monooleate and 4.3 g of polyoxyethylene sorbitan monostearate being successively added and dissolved. With further weak stirring a stream of nitrogen is passed into the solution and the temperature is adjusted to 60° C. 94 ml of water are given into a separate vessel and 6.4 g of AMPS, 44.8 g of acrylamide, 9.2 g of vinyl pyrrolidone and 10.6 g of N-vinyl formamide are added and dissolved while stirring. This solution is adjusted to a pH value of 8 to 10 by the dropweise addition of 10% strength aqueous solution of sodium hydroxide, 0.1 g of ammonium persulfate being subsequently added. This monomeric solution is then emulsified in the organic phase via a dropping funnel in the reaction flask, with rapid stirring. The polymerization reaction starts after approximately 30 minutes, which is recognizable by a rise in the temperature. In the course of 15 minutes the reaction temperature rises to 80°–90° C. The polymerizing reaction having faded out, the solution is heated for another two hours at 80° C. A stable emulsion having a polymeric content of 30% by weight is obtained. The molecular weight of the polymer is 95,000.

EXAMPLE 69

1.85 g of sorbitan monostearate are dissolved in a technical isomeric hydrocarbon solvent Isopar M having a boiling range of from 200° to 240° C. sold by Exxon Corporation. This solution is introduced into a 2-liter reaction vessel fitted with a mechanical stirrer, thermometer and gas inlet for nitrogen. A solution of monomers is produced by dissolving 25.0 g of acrylamide, 3.7 g of acrylic acid and 9.2 g of vinyl formamide in 40 ml of deionized water and the pH value of the mixture is adjusted to 8.5 by adding a 20% aqueous solution of sodium hydroxide. Then the aqueous monomeric solution is slowly added to the organic sorbitan monostearate solution while vigorously stirring and the air in the reaction vessel is replaced by nitrogen.

0.07 g of 2,2'-Azobis-iso-butyronitrile, dissolved in acetone, are added to the emulsion of the monomers and then the reaction vessel gently heated to 60° C. while stirring. The polymerizing reaction was finished with 2.5 hours resulting in a stable emulsion of the copolymer.

EXAMPLE 70

67 g of Isopar M are introduced into a 1-liter polymerization flask and heated to a temperature of 60° C., with weak stirring, 0.27 g of sorbitan monolaurate, 1.3 g of sorbitan monostearate, 0.17 g of sorbitan monooleate and 4.3 g of polyoxyethylene sorbitan monostearate being successively added and dissolved. With further weak stirring a stream of nitrogen is passed into the solution and the temperature is adjusted to 60° C. 94 ml of water are given into a separate vessel and 12.8 g VIMA, 39.8 g of acrylamide, 12.0 g of vinyl pyrrolidone and 6.4 g of N-vinyl formamide are added and dissolved while stirring. This solution is adjusted to a pH value of 8 to 10 by the dropwise addition of 10% strength aqueous solution of sodium hydroxide, 0.1 g of ammonium persulfate being subsequently added. This monomeric solution is then emulsified in the organic phase via a dropping funnel in the reaction flask, with rapid stirring. The polymerization reaction starts after approximately 30 minutes, which is recognizable by a rise in the temperature. In the course of 15 minutes the reaction temperature rises to 80°–90° C. The polymerizing reaction having faded out, the solution is heated for another two hours at 80° C. A stable emulsion having a polymeric content of 30 percent by weight is obtained. The molecular weight of the polymer is 95,000.

Along the lines given in Examples 68 to 70 the products of the following Table III can be produced which may be used as valuable friction reducer for aqueous acids.

TABLE III

| AM | AS | AMPS | VF | | $\eta$/rel. | k-value |
|---|---|---|---|---|---|---|
| 65 | 20 | | 15 | | 6.59 | 148 |
| 65 | 20 | | 15 | | 10.05 | 165.8 |
| 65 | 20 | | 15 | | 9.36 | 163 |
| 60 | | 20 | 15 | 5 NMA | 17.27 | 186 |
| 60 | | 20 | 15 | 5 NMVA | 11.97 | 172.7 |
| 60 | | 20 | 15 | 5 NMVF | 11.0 | 169.4 |
| 60 | | 20 | 15 | 5 NMVF | 7.0 | 151.2 |
| 60 | | 20 | 15 | 5 NMVF | 9.47 | 164 |
| 60 | 20 | | 15 | 5 NMA | 35.0 | 210.9 |
| 60 | 20 | | 15 | 5 NMVF | 24.43 | 198 |
| 51.8 | 13.2 | | 30 | 5 NMA | 4.66 | 132.8 |
| 51.8 | 13.2 | | 30 | 5 NMVA | 4.53 | 131.5 |
| 51.8 | 13.2 | | 30 | 5 NMVF | 3.41 | 117.4 |
| 51.8 | 13.2 | | 30 | 5 NMA | 12.16 | 173 |
| 51.8 | 13.2 | | 30 | 5 NMVA | 9.1 | 162.32 |
| 51.8 | 13.2 | | 30 | 5 NMVF | 9.3 | 163.16 |
| 60 | 20 | | 15 | 5 NMA | 31.44 | 207.4 |
| 51.8 | 13.2 | | 30 | 5 NMVF | 3.57 | 119.0 |
| 65 | | 10 | 5 | 20 VIP | 29.3 | 204 |

All amounts given in Table III are parts by weight.

EXAMPLE 71

To demonstrate the friction reducing properties of the polymer described in Example 1, an experiment was conducted comparing an acidified polymer solution to a 7½% hydrochloric acid solution. The experimental data was obtained from a flow loop. This device passes a fluid through a series of pipes of known length and diameter at selected rates while the exerted pressure is measured at both ends of a given pipe. Knowing the fluid rate and pressure differential, the friction pressures of various fluids can be graphically shown. The initial experiment was conducted using 55 gallons of 7½% hydrochloric acid and 760 ml of a common corrosion inhibitor at pump rates of 10 to 15 gal./min. on a 0.364" I.D. pipe, 5 to 45 gal./min. on 0.493" I.D. pipe, and 5 to 120 gal./min. for 1.049" I.D. pipe. then, 224 g of the polymer prepared in Example 1 was added to the 7½% acid solution yielding a 0.1% (by weight) polymer solution. The experiment was repeated and the data are shown in FIGS. 1, 2 and 3 for 0.364", 0.493" and 1.049" I.D. pipe, respectively.

EXAMPLE 72

To demonstrate the acid solubility of the copolymer of this invention, an experiment was conducted comparing this copolymer to currently marketed friction reducers. Into three 8 ounce jars was added 200 mls of 15% hydrochloric acid. Into jar 1 was added 2.0 g of the polymer prepared in Example 2 while in jar 2 was added 2.90 g of an emulsified friction reducer, LFR-1, and in jar 3, was added 3.2 g of a commonly used emulsified friction reducer, LFR-2. LFR-1 and LFR-2 are copolymers of acrylamide and acrylic acid with molecular weight of 500,000 to 2,000,000. The polymer content of the emulsions LFR-1 and LFR-2 are unknown, however, it is believed that differences lie in the amount of active polymers, types of emulsifiers and ratios of comonomers. Each sample was heated to 60° C. for 24 hours. In jar 1, the copolymer of this invention was completely soluble. In both jars 2 and 3, a white insoluble plug had formed. The solids were filtered under suction and washed with water followed by methanol. The filtered solids were then dried at 40° C. under reduced pressure overnight. The final masses are shown in Table IV.

TABLE IV

| Sample | Initial Weight | Weight of Insoluble Material | Percent Insoluble |
|---|---|---|---|
| Copolymer of this invention | 2.0 g | 0 | 0 |
| LFR-1 emulsion | 2.90 g* | 1.15 g | 39.6 |
| LFR-2 emulsion | 3.20 g* | 0.82 g | 25.6 |

*It should be noted that the weight is based on the emulsion not polymer.

EXAMPLE 73

A gas well in West Texas is selected to fracture-acidize. The producing interval is 3,620 to 3,680 feet. At this depth the bottom hole static temperature is 110° F. while the formation permeability averaged 0.15 millidarcy. The tubing size is 2⅜ inch, 4.7 lb. and the well productivity prior to treatment is 6,000 ft.³/day. The fracture-acidizing fluid is prepared by blending 1,000 gallons of 28% hydrochloric acid with 9,5000 gallons of fresh water. In addition, 21 gallons (0.2% by weight) of the emulsion prepared in Example 3 is added to the acidic solution. The fluid is injected into the well at 10 barrels/min. at a pressure of 4,500 psi. After 25 minutes, the pumping is terminated and the well is shut in to allow the acid to react. After 60 minutes the wellhead pressure is relieved and the well is placed back into a flowing status. The well productivity is tested and found to be significantly improved.

What we claim is:

1. Copolymers soluble in water and aqueous acids containing a statistical distribution of 5 to 50% by weight of moieties of formula I

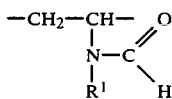

(I)

10 to 95% by weight of moieties of formula II

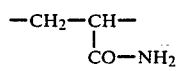

(II)

and 1 to 85% by weight of moieties of formula III

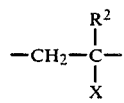

(III)

wherein $R^1$ stands for hydrogen, methyl or hydroxymethyl, $R^2$ stands for hydrogen or methyl and X stands for cyano, the carboxyl group or its alkali or ammonium salts, the alkoxycarbonyl group having 1 to 6 carbon atoms, the hydroxyalkoxycarbonyl group having 1 to 3 carbon atoms, the N-methylolamidocarbonyl group, methylol, methylol etherified with alkanols having 1 to 4 carbon atoms, alkanoylamino group having 1 to 4 carbon atoms, alkanoylamino of 1 to 4 carbon atoms N-substituted with methylol or alkyl having 1 to 4 carbon atoms, pyridinium pyrrolidonyl-(1), phenyl, the phosphonic acid group, alkali or ammonium salts of the phosphonic acid group, a moiety of the formula IV

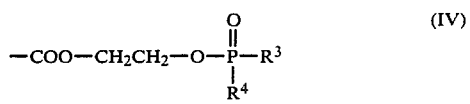

wherein $R^3$ and $R^4$ are the same or different and represent alkyl having 1 to 4 carbon atoms, a moiety of the formula V

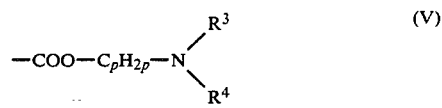

wherein p is a number from 1 to 4, a moiety of the formula VI

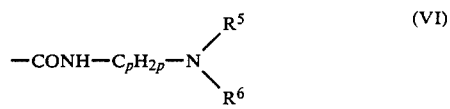

wherein $R^5$ and $R^6$ are the same or different and each is alkyl having 1 to 4 carbon atoms, or the quaternary ammonium salt of formula (V) and (VI).

2. The copolymer according to claim 1 wherein the copolymer comprises
   10 to 30% by weight of moieties of formula I,
   50 to 75% by weight of moieties of formula II, and
   5 to 40% by weight of moieties of formula III.

3. The copolymer according to claim 2 wherein X is carboxyl, alkanoylamino having 1 to 4 carbon atoms unsubstituted or N-substituted with methylol or alkyl having 1 to 4 carbon atoms, pyrrolidonyl-(1), a moiety of formula V or VI and Na-, K- or NH4-salts of the carboxylic acid.

4. The copolymer according to claim 2 having a K-value of about between 25 and 250 corresponding to molecular weights of about between 20,000 and $15 \times 10^6$.

5. The copolymer according to claim 4 having a K-value of about 50 to 200 corresponding to molecular weights of about 100,000 to $4 \times 10^6$.

6. The copolymer according to claim 1 wherein X is alkoxycarbonyl having 1 to 3 carbon atoms.

7. The copolymer according to claim 2 wherein units of formula (III) are introduced into the copolymer by copolymerizing with a monomer selected from the group consisting of
   N-Vinylformamide,
   N-Vinyl-N-methyl-formamide,
   N-Vinyl-acetamide,
   N-Vinyl-N-methyl-acetamide,
   N-Vinylpyrrolidone,
   Acrylic acid, alkali or ammonium salts of acrylic acid,

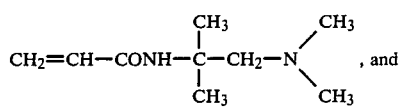

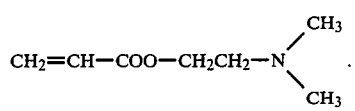

8. An aqueous polymer solution containing 0.5 to 6 percent by weight of the copolymer according to claim 2.

9. A water in oil emulsion having as its aqueous phase a solution of the copolymer according to claim 2.

10. An aqueous polymer solution containing 0.5 to 6 percent by weight of the copolymer according to claim 1.

11. A water in oil emulsion having as its aqueous phase a solution of the copolymer according to claim 1.

12. The copolymer according to claim 1 wherein X is carboxyl, alkanoylamino having 1 to 4 carbon atoms unsubstituted or N-substituted with methylol or alkyl having 1 to 4 carbon atoms, pyrrolidonyl-(1), a moiety of formula V or VI and Na-, K- or NH$_4$-salts of the carboxylic acid.

13. The copolymer according to claim 1 having a K-value of about between 25 and 250 corresponding to molecular weights of about between 20,000 and $15 \times 10^6$.

14. The copolymer according to claim 13 having a K-value of about 50 to 200 corresponding to molecular weights of about 100,000 to $4 \times 10^6$.

15. The copolymer according to claim 1 wherein units of formula (III) are introduced into the copolymer by copolymerizing with a monomer selected from the group consisting of
N-Vinylformamide,
N-Vinyl-N-methyl-formamide,
N-Vinyl-acetamide,
N-Vinyl-N-methyl-acetamide,
N-Vinylpyrrolidone,
Acrylic acid, alkali or ammonium salts of acrylic acid,

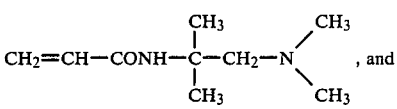

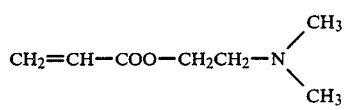

16. An aqueous polymer solution containing 0.5 to 6 percent by weight of the copolymer according to claim 1.

17. A water in oil emulsion having as its aqueous phase a solution of the copolymer according to claim 1.

* * * * *